United States Patent [19]

Hensgen et al.

[11] Patent Number: 4,804,079
[45] Date of Patent: Feb. 14, 1989

[54] APPARATUS FOR TRANSPORTING GROUPS OF ROD-SHAPED ARTICLES OF THE TOBACCO PROCESSING INDUSTRY

[75] Inventors: Gerhard Hensgen, Hamburg; Siegfried Schlisio, Geesthacht; both of Fed. Rep. of Germany

[73] Assignee: Körber AG, Hamburg, Fed. Rep. of Germany

[21] Appl. No.: 111,402

[22] Filed: Oct. 20, 1987

[30] Foreign Application Priority Data

Oct. 30, 1986 [DE] Fed. Rep. of Germany ....... 3637005

[51] Int. Cl.[4] ............................................. B65G 47/68
[52] U.S. Cl. ................................. 198/450; 198/471.1; 198/475.1
[58] Field of Search ............ 198/438, 441, 450, 468.4, 198/471.1, 475.1, 803.5

[56] References Cited

U.S. PATENT DOCUMENTS

| | | |
|---|---|---|
| 1,705,012 | 3/1929 | Grupe . |
| 2,917,156 | 12/1959 | Pollmann .......................... 198/468.4 |
| 3,572,493 | 9/1971 | Babunovic .......................... 198/441 |
| 4,406,197 | 9/1983 | Bardenhagaen et al. ......... 198/475.1 |
| 4,467,908 | 8/1984 | Schneider ........................... 198/441 |
| 4,645,063 | 2/1987 | Seragnoli ........................... 198/450 |

Primary Examiner—Joseph E. Valenza
Attorney, Agent, or Firm—Peter K. Kontler

[57] ABSTRACT

Plain cigarettes which are obtained by subdividing two parallel cigarette rods issuing from a maker of twin cigarette rods are accepted by successive orbiting arms of a first rotary conveyor in such a way that each arm attracts a cigarette of one of the rows and a cigarette of the other row. The arms deliver the respective pairs of cigarettes to a transfer station where the cigarettes are accepted by the peripheral flutes of a second rotary conveyor for admission into or for transport in a filter tipping machine. Alternating flutes of the second conveyor are mounted on pivotable levers or on reciprocable pushers so that each such movable flute can receive a cigarette from the oncoming arm of the first conveyor while the other cigarette is being transferred directly from the arm into a non-movable flute of the second conveyor. The mutual spacing of cigarettes can be increased or reduced during transfer from the arms into the flutes of the second conveyor. The plane of rotation of the first conveyor and the plane of the two files of plain cigartettes make an acute angle.

17 Claims, 3 Drawing Sheets

APPARATUS FOR TRANSPORTING GROUPS OF ROD-SHAPED ARTICLES OF THE TOBACCO PROCESSING INDUSTRY

BACKGROUND OF THE INVENTION

The invention relates to improvements in apparatus for transporting rod-shaped articles of the tobacco processing industry, such as filter rod sections and plain or filter cigarettes, cigars or cigarillos. More particularly, the invention relates to improvements in apparatus which can be utilized to change the direction of advancement of rod-shaped articles (hereinafter called cigarettes for short with the understanding, however, that filter rod sections, cigars, cigarillos and/or cheroots can be manipulated in the same or in a similar way) so that the articles are transferred from a path wherein they advance axially or longitudinally to a path wherein they advance transversely or sideways, or vice versa. Still more particularly, the invention relates to improvements in apparatus which can be utilized with advantage to simultaneously transfer several (e.g., pairs of) cigarettes from first paths wherein the cigarettes advance in one of the aforementioned directions into second paths wherein the cigarettes advance in the other direction.

It is already known to manipulate plain cigarettes in a maker (e.g., in a machine known as PROTOS which is produced by the assignee of the present application) in such a way that successive plain cigarettes of a single file of such articles (wherein the cigarettes are disposed end-to-end as they come from the cutoff which is a device for subdividing a continuous cigarette rod into discrete plain cigarettes) are engaged by successive suction heads of a series of orbiting suction heads and the suction heads transfer the cigarettes into successive axially parallel flutes at the periphery of a rotary drum-shaped conveyor forming part of or serving to deliver cigarettes sideways into a filter tipping machine (such as that known as MAX which is produced by the assignee of the present application) wherein the cigarettes are united with filter plugs to form filter cigarettes of unit length or multiple unit length. The drum-shaped conveyor serves to form a row of parallel cigarettes which move at right angles to their respective axes and are disposed at a desired distance from each other. Reference may be had to commonly owned U.S. Pat. No. 4,051,947 to Schumacher et al. which describes an apparatus capable of converting a single file of rodshaped articles of the tobacco processing industry into one or more rows of articles which move transversely of their respective axes.

The situation is different if the maker is designed to turn out several files of plain cigarettes or like articles or if the articles issuing from two or more makers are to be manipulated for the purpose of introducing them into a filter tipping, packing or other processing machine. Makers which can produce several cigarette rods are gaining in popularity because their output is much higher than that of heretofore known makers which produce a single cigarette rod. All of the articles issuing from a maker that turns out several continuous rods which are subdivided into plain cigarettes or other rod-shaped articles of the tobacco processing industry cannot be readily manipulated by heretofore known transferring apparatus. Therefore, the maker cannot always operate at a maximum speed because the locus of transfer of rod-shaped articles from its outlet to the next machine constitutes or is likely to constitute a bottleneck in a production line that normally includes one or more makers, one or more filter rod making machines, one or more filter tipping machines and one or more packing machines.

OBJECTS AND SUMMARY OF THE INVENTION

An object of the invention is to provide a novel and improved apparatus which can transport large quantities of rod-shaped articles, such as cigarettes, per unit of time in a small area and with a high degree of accuracy without defacing and/or otherwise damaging the articles.

Another object of the invention is to provide an apparatus which can convert several files of rod-shaped articles moving end-to-end into one or more rows wherein the articles are caused to advance at right angles to their respective longitudinal axes.

A further object of the invention is to provide an apparatus which can be installed between existing making and processing machines as a superior substitute for heretofore known apparatus and is capable of transferring the entire output of a maker of several continuous cigarette rods into a filter tipping machine or another processing machine.

An additional object of the invention is to provide novel and improved conveyor means for use in the above outlined apparatus.

Still another object of the invention is to provide novel and improved means for transferring rod-shaped articles of the tobacco processing industry between such conveyor means.

A further object of the invention is to provide a maker of several cigarette rods with the above outlined apparatus.

Another object of the invention is to provide a production line which turns out plain or filter cigarettes and embodies the above outlined apparatus.

An additional object of the invention is to provide a novel and improved method of manipulating rod-shaped articles of the tobacco processing industry which are delivered or transported away in the form of several files wherein the articles are disposed end-to-end.

The invention is embodied in an apparatus for transporting rod-shaped articles of the tobacco processing industry, for example, between a cigarette maker and a filter tipping machine. The apparatus comprises means for supplying a plurality of parallel files of rod-shaped articles (such as plain cigarettes of unit length or multiple unit length) wherein the articles of each file are coaxial with one another and can but need not abut each other end-to-end, first conveyor means having means for simultaneously removing articles or groups of two or more articles from each of the files and for transporting the removed articles along a first path, and second conveyor means having means for simultaneously accepting a plurality of articles from the removing means for transport along a second path. The articles in one of the paths (e.g., in the first path) are transported axially, and the articles in the other of the paths are transported sideways, i.e., substantially transversely of their respective axes. The first conveyor means can include means for orbiting the removing means in a predetermined plane, and each such removing means has a plurality of receptacles each of which is arranged to receive a discrete article or a group of two or more coaxial articles.

In accordance with a presently preferred embodiment, the supplying means includes means (e.g., elongated rails or belt conveyors) for supplying a first and a second file of articles at a predetermined distance from each other. The removing means comprises or comprise first and second receptacles which are disposed at such predetermined distance from each other so that, during each pass along the two files of rod-shaped articles, each receptacle can accept or pick up a discrete article or two or more coaxial articles from the corresponding file of articles. The first and second files of articles are disposed in a second plane which is inclined with reference to the predetermined plane; such planes preferably make an acute angle.

The removing means further comprises means for advancing the first and second receptacles along an endless elliptical path and for holding the articles in the receptacles against a change of orientation, i.e., the receiving means can transport the articles along the elliptical path in the same orientation as that of the articles in the respective files.

The second conveyor means can include a rotary conveyor (e.g., a substantially drum- or wheel-shaped conveyor) having axially parallel flutes which constitute or form part of the article accepting means.

Each of the conveyor means can include a rotary conveyor, and such conveyors are then preferably rotatable about axes which are disposed at right angles to each other.

The removing means can include a first and a second receptacle for articles (each such receptacle can constitute or include a trough-shaped receptacle having a flute for a discrete article or for two or more coaxial articles), and the accepting means can include first and second receptacles for articles (each such receptacle can have a flute for a discrete article or for two or more coaxial rod-shaped articles). Such apparatus further comprises means for moving one of the first receptacles (i.e., the first receptacle of the receiving means or the first receptacle of the accepting means) relative to the other of these first receptacles to thus effect a transfer of articles between the first receptacles, such as from the first receptacle of the receiving means to the first receptacle of the accepting means. As mentioned above, each conveyor means can comprise a rotary conveyor, and the moving means can include means for moving the one first receptacle in a direction having a component extending substantially radially of the respective rotary conveyor. For example, the movable first receptacle can constitute one receptacle of the accepting means and is movable substantially radially of the rotary conveyor of the second conveyor means or is movable in such direction that at least one component of its movement extends in a direction radially of the rotary conveyor of the second conveyor means.

The files of rod-shaped articles can be disposed in a substantially horizontal plane.

In accordance with a presently preferred embodiment, the removing means of the first conveyor means is arranged to orbit along the first path and includes a pair of parallel receptacles each serving to remove an article from a different file. The second conveyor means of such apparatus comprises a rotary conveyor having a plurality of axially parallel peripheral flutes constituting the aforementioned accepting means. The rotary conveyor is further equipped with a rotary support (such as the main body of a drum-shaped conveyor with peripheral flutes), and the flutes include a first flute which is fixedly mounted on or is otherwise provided in or on the support, and a second flute which is movable relative to the support. The first flute serves to receive articles from one of the receptacles, and the second flute serves to receive articles from the other of the receptacles. The first path has a first portion for the one receptacle and a second portion for the other receptacle. The first portion of the first path is nearer to the second path than the second portion of the first path, and the second conveyor means of such apparatus further comprises means for moving the second flute substantially radially of the support to and from a position for reception of articles from the other receptacle. Such moving means can include carrier means for the second flute and means for cyclically displacing the carrier means relative to the support of the rotary conveyor of the second conveyor means during each revolution of the rotary conveyor. The carrier means can comprise a reciprocable pusher for the second flute, and the displacing means can comprise cam means. Alternatively, the carrier means can comprise a lever which is pivotable with reference to the support by the cam means or by other suitable displacing means. The displacing means can comprise a cam having a concave carrier-displacing portion or a cam having a convex carrier-displacing portion (i.e., the cam can be a so-called internal cam or a so-called external cam).

The moving means (be it a lever or a pusher (but normally a lever) can be designed to change the mutual spacing of articles during transfer from the receptacles to the rotary conveyor of the second conveyor means. The changing means can be designed to increase or to reduce the mutual spacing of articles during transfer from the receptacles onto the rotary conveyor, depending upon the mutual spacing of stationary and mobile flutes on the rotary conveyor as compared with the mutual spacing of the two files of rod-shaped articles.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
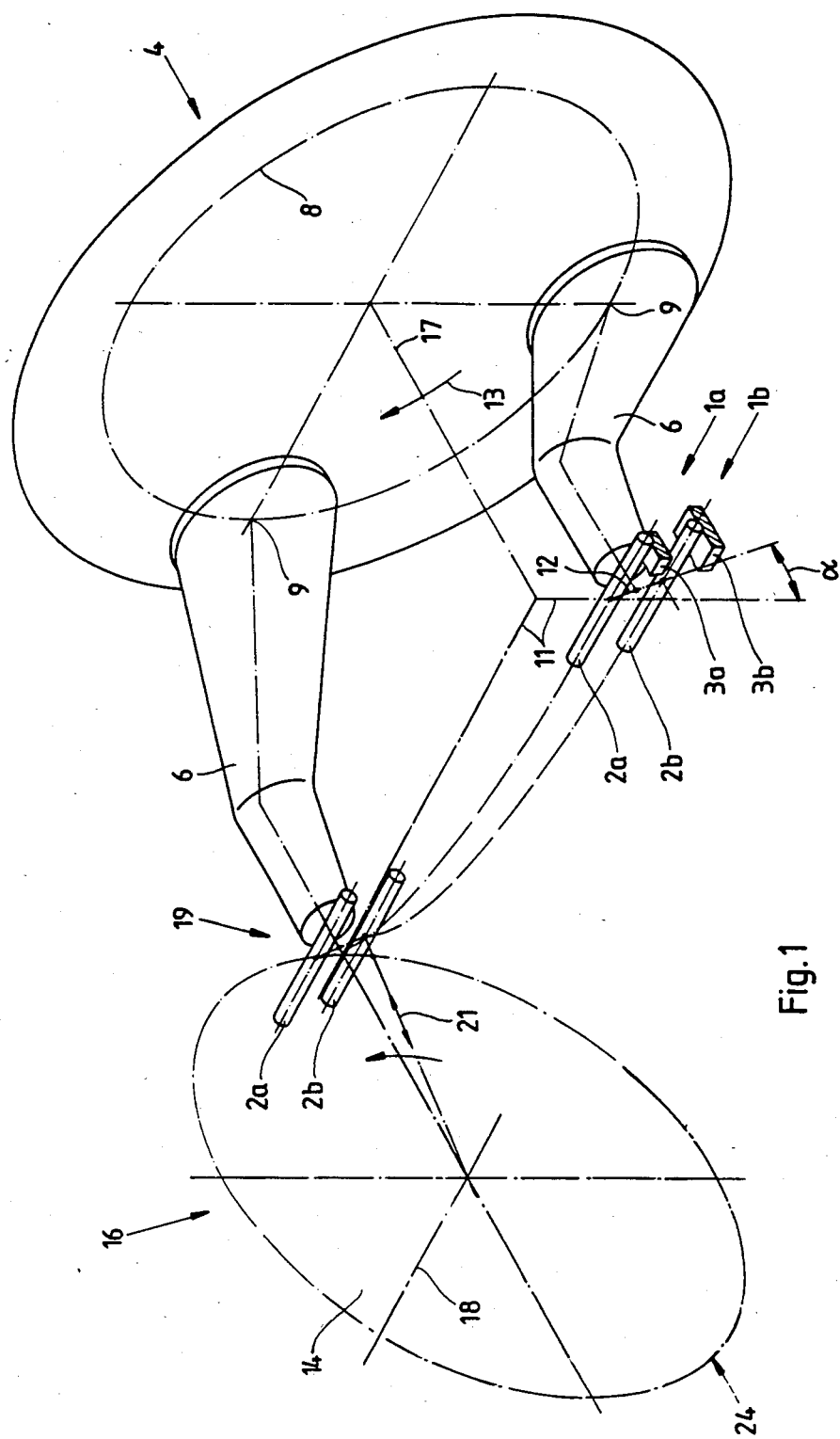
FIG. 1 is a schematic perspective view of an apparatus which embodies one form of the invention, with certain article supporting elements of the first conveyor omitted.

FIG. 1 shows schematically two guide rails 3a, 3b which serve to supply two parallel files of discrete plain cigarettes 2a, 2b issuing from a maker which turns out two continuous cigarette rods and has means (cutoffs) for subdividing each rod into a file of plain cigarettes of unit length or multiple unit length. The two files of cigarettes 2a, 2b are disposed in a common plane 11 (denoted by two phantom lines) and the cigarettes 2a, 2b are respectively advanced in directions which are indicated by arrows 1a and 1b.

The apparatus which is shown in FIG. 1 serves to transfer pairs of plain cigarettes 2a, 2b from the guide rails 3a, 3b into the axially parallel peripheral receptacles or flutes of a rotary drum-shaped conveyor 14 forming part of a second conveyor means 16 which cooperates with a first conveyor means 4 having a set of equidistant article removing arms 6 (only two shown in FIG. 1). The first conveyor means 4 causes the arms 6 to orbit along an endless circular path 8 in such a way that a selected point of each arm is located in a plane 12 making with the plane 11 an acute angle alpha. The drum-shaped conveyor 14 of the second conveyor means 16 rotates about an axis 18 which makes an angle of 90 degrees with the axis 17 of rotation of the first conveyor means 4. Each arm 6 resembles a crank and its free end portion is provided with two parallel receptacles 7a, 7b (FIG. 2) each of which is or includes a flute serving to receive and to temporarily attract a plain cigarette during and subsequent to travel past the guide rails 3a, 3b on to a transfer station 19 between the conveyor means 4 and 16. Successive cigarettes 2a of the file on the rail 3a are assumed to be disposed end-to-end and in close or immediate proximity to each other, and the same applies for the cigarettes 2b on the guide rail 3b.

The means for orbiting the arms 6 of the first conveyor means 4 along the path 8 preferably comprises two superimposed planetary transmissions of the type disclosed in the aforementioned patent to Schumacher et al. The arms 6 not only orbit about the axis 17 of the first conveyor means 4 but they also rotate about their respective axes 9 so as to ensure that the orientation of their receptacles 7a, 7b remains unchanged, i.e., that such receptacles are invariably parallel to the cigarettes 2a, 2b on the guide rails 3a, 3b. This entails a travel of receptacles 7a, 7b along an elliptical path. Reference may be had to the aforementioned patent to Schumacher et al.

Figure 2:
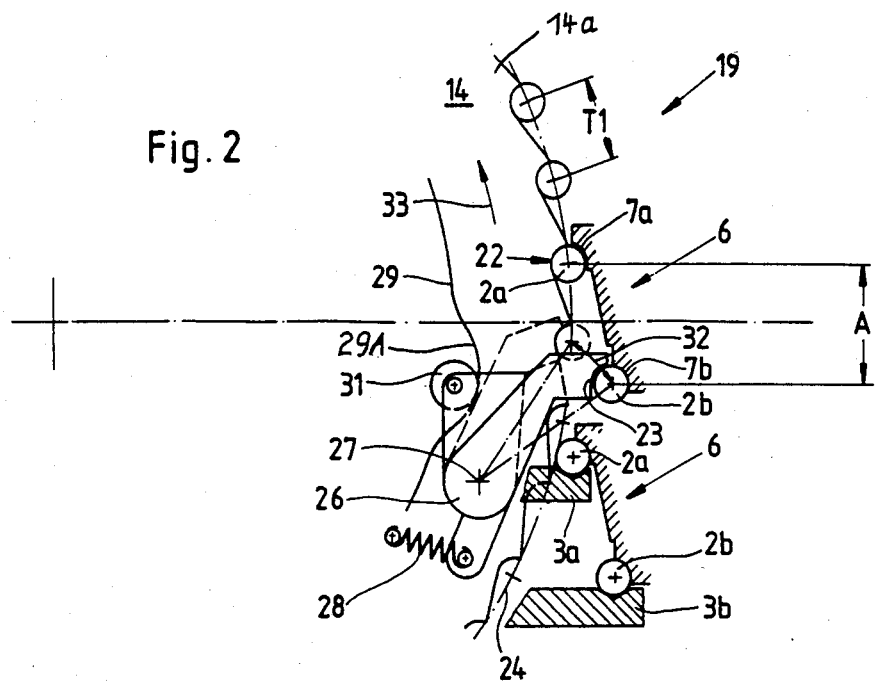
FIG. 2 is an enlarged fragmentary partly elevational and partly sectional view of the transfer station between the first and second conveyors, showing one form of means for movably supporting certain article receiving flutes of the second conveyor.

When the motor or motors which drive the conveyor means 4 and 16 are on, the conveyor means 4 rotates in the direction which is indicated by arrow 13 and successive pairs of receptacles 7a, 7b remove successive foremost cigarettes 2a, 2b from the paths which are defined by the guide rails 3a, 3b so that the thus removed cigarettes then travel along a portion of the aforementioned elliptical path and are taken over by the respective receptacles or flutes of the rotary conveyor 14 at the transfer station 19. As can be seen in FIG. 2, the guide rail 3b is more distant from the path of the flutes (receptacles) 22, 23 at the periphery of the rotary conveyor 14 of the second conveyor means 16 than the guide rail 3a and, therefore, it is necessary to move each cigarette 2b from the path which is provided for the receptacles 7b toward the axis 18 of the conveyor 14 by moving the cigarette 2b in a direction which has a component substantially radially of the conveyor 14. The mutual spacing of centers of the receptacles 7a, 7b on any of the arms 6 equals A (FIG. 2) and is the same as the spacing between the axes of two neighboring cigarettes 2a, 2b in the paths which are defined by the guide rails 3a, 3b. The mutual spacing of cigarettes 2a, 2b in the flutes 22, 23 of the rotary drum-shaped conveyor 14 is less (it equals T1) so that the cigarette 2b which has been accepted from a receptacle 7b must be moved nearer to the respective cigarette 2a during transfer from the receptacle 7b to the periphery of the conveyor 14.

The transfer of cigarettes 2a, 2b from a pair of receptacles 7a, 7b on an arm 6 onto the conveyor 14 of the first conveyor means 16 further involves a change in the direction of movement of such articles from axial movement (arrows 1a, 1b) to a sidewise or transverse movement at right angles to the axes of cigarettes at the periphery of the conveyor 14. Due to the inclination (angle alpha) of the planes 11 and 12 relative to each other, each of the cigarettes 2a can be transferred from the respective receptacle 7a directly into the respective flute 22 of the conveyor 24; however, the path for the receptacles 7b of successive arms 6 is more distant from the pitch circle 14 of the flutes 22, 23 at the periphery of the conveyor 14; therefore, each of the flutes 23 is provided in the free end portion of a carrier 26 in the form of a lever which is fulcrumed on the conveyor 14, as at 27, and is pivotable relative to the main body portion or support 14a of the conveyor 14 between the solid-line and phantom-line positions of FIG. 2. The directions in which the flutes 23 of the conveyor 14 are movable with the respective levers 26 are indicated in FIG. 1 by a double-headed arrow 21. Each lever 26 is biased by a coil spring 28 which tends to retract it into the support 14a of the conveyor 14 so that the center of the respective flute 23 is located on the pitch circle 24 of the conveyor 14. A stationary internal cam 29 having a concave displacing portion 29A for the carrier or lever 26 is provided at the transfer station 19 to pivot the lever 26 from the broken-line position to the solid-line position of FIG. 2 so that the flute 23 on such lever or carrier ca accept an article 2b before the spring 28 is free to return the lever 26 to the phantom-line position in which the freshly transferred cigarette 2b is located at the periphery of the conveyor 14 between the cigarettes 2a in the two neighboring non-movable (stationary) flutes 22. The lever 26 has a roller follower 31 which tracks the face of the internal cam 29 and ensures that the lever 26 pivots first clockwise and thereupon counterclockwise during travel past the transfer station 19. The flute 23 of the lever 26 communicates with suction ports (not specifically shown) which are then connected to a suction generating device to attract the cigarette 2b - in the receptacle 7b of the oncoming arm 6 and to transfer the cigarette 2b onto the periphery of the conveyor 14. The directions of movement of the flute 23 at the free end of the lever 26 shown in FIG. 2 are indicated by a double-headed arrow 32. The arrow 33 indicates the direction of rotation of the conveyor 14; it will be seen that the flute 23 which moves in the direction of the arrow 32 has a component of movement in the radial direction of the conveyor 14. The coil springs 28 cooperate with the internal cam 29 to constitute a means for reducing the mutual spacing of simultaneously transferred cigarettes 2a, 2b from A to T1 during transfer of such cigarettes from the receptacles 7a, 7b of an arm 6 onto the conveyor 14 during travel of the arm 6 past the transfer station 19.

Figure 3:
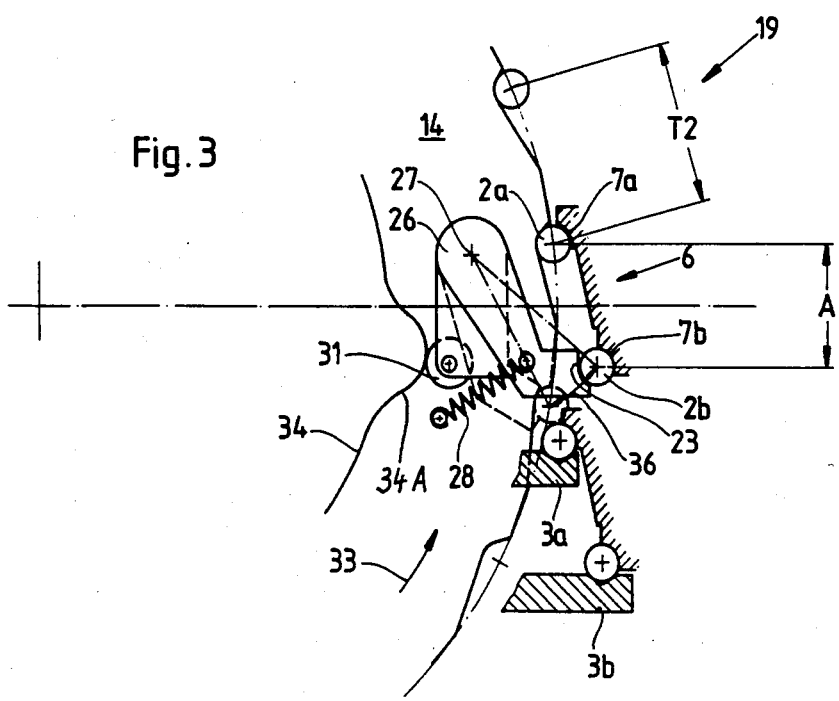
FIG. 3 is a similar fragmentary partly elevational and partly sectional view but showing modified means for actuating the means for supporting the movable article receiving flutes of the second conveyor.

FIG. 3 shows a portion of a modified conveyor 14 wherein each pivotable carrier or lever 26 is again biased by a coil spring 28 but its roller follower 31 tracks the convex surface of an external cam 34 having a convex portion or lobe 34A which can displace the lever 26 during travel past the transfer station 19 to ensure that the flute 23 in the free end portion of such lever can accept a cigarette 2b from the oncoming receptacle 7b of an arm 6 and thereupon deposits the article 2b at the periphery of the conveyor 14 under the action of the coil spring 28 when the lever 26 advances beyond the lobe 34A. Such pivoting of the leverl 26 results in an increase of the mutual spacing of adjacent cigarettes 2a, 2b from A (the mutual spacing of the paths of cigarettes 2a, 2b on the guide rails 3a, 3b) to T2 (which is the mutual spacing of flutes 22, 23 at the periphery of the conveyor 14). The arrow 36 indicates the directions of movement of flutes 23 in the free ends of levers 26 between the extended positions (remote from the pitch circle of the conveyor 14) to the retracted positions (in which the levers 26 are concealed in the support of the conveyor 14). The cam 34 and the spring 28 cooperate to serve as a means for increasing the mutual spacing of cigarettes 2a, 2b from A to T2 during transfer of such articles from the conveyor including the arms 6 onto the conveyor 14 during travel of the arms 6 past the transfer station 19.

Figure 4:
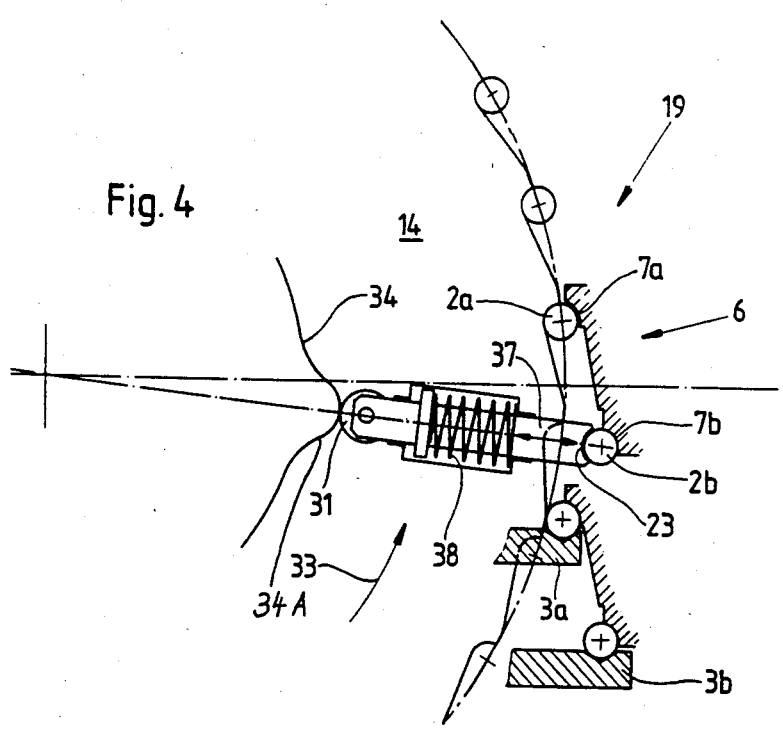
FIG. 4 is a similar fragmentary partly elevational and partly sectional view but showing modified means for movably supporting certain article receiving flutes of the second conveyor.

FIG. 4 shows a third embodiment wherein the levers 26 of FIGS. 2, 3 are replaced by pushers 37 (only one shown) which are movable radially of the conveyor 14 of the second conveyor means and each of which carries a flute 23 at its outer end and a roller follower 31 at its inner end. The roller followers 31 track an external cam 34 having a convex lobe 34a which displaces the oncoming pusher 37 at the transfer station 19 so that the corresponding flute 23 can accept a cigarette 2b from the oncoming receptacle 7b and a coil spring 38 thereupon retracts the pusher 37 so that the cigarette 2b comes to rest at the periphery of the rotating drum-shaped conveyor 14 between a pair of cigarettes 2a in the neighboring flutes 22 of the conveyor 14.

Figure 5:
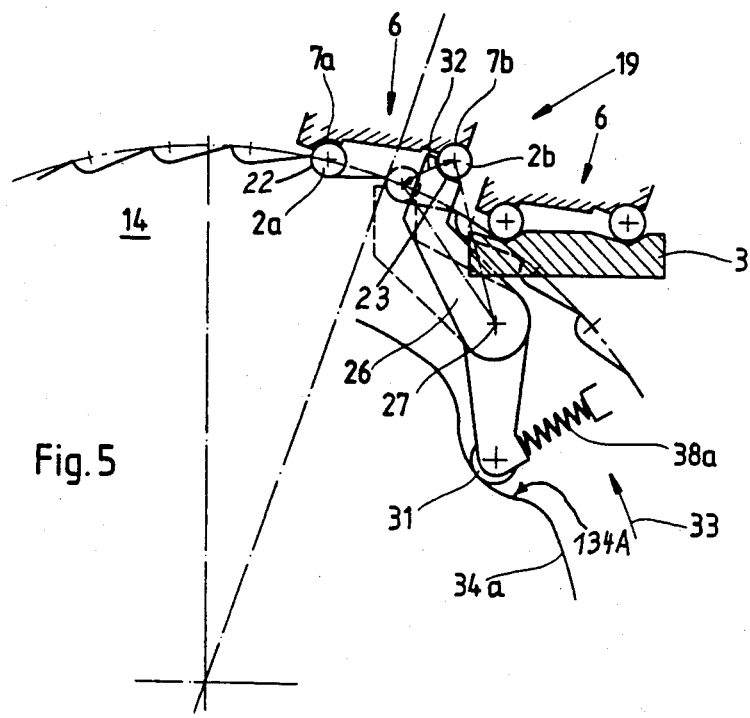
FIG. 5 is a similar fragmentary partly elevational and partly sectional view but showing different means for actuating the modified supporting means.

FIG. 5 shows a further embodiment wherein the plane of the two files of cigarettes 2a, 2b on a single guide rail 3 is horizontal. This is the preferred positioning of the two files of cigarettes 2a, 2b in a maker which turns out two parallel cigarette rods and wherein such rods are then subdivided to form two horizontal files of cigarettes with the two files located in a common horizontal plane. The carriers for mobile flutes 23 are pivotable levers 26 (only one shown in FIG. 5) which are biased by coil springs 38a so as to maintain their roller followers 31 in engagement with a stationary cam 34a having a recess bounded by a concave surface 134A which causes the lever 26 to accept a cigarette 2b from the oncoming receptacle 7b of the arm 6 at the transfer station 19. This station is located at a level above the path of movement of cigarettes 2a, 2b with the single guide rail 3 which replaces the guide rails 3a, 3b of FIGS. 2 to 4. The horizontal plane which is common to the two files of cigarettes 2a, 2b on the guide rail 3 again makes an acute angle with the path of movement of the flutes or receptacles 7a, 7b. The coil spring 38a cooperates with the cam 34a to ensure that the mutual spacing of cigarettes 2a, 2b is reduced from A to T1 during transfer of such articles from the receptacles 7a, 7b of an arm 6 into the respective flutes 22, 23 of the rotary drum shaped conveyor 14. An advantage of the apparatus which is shown in FIG. 5 is that the two files of cigarettes 2a, 2b are located in a horizontal plane and also that the guide rails 3a, 3b of FIGS. 1-4 can be replaced with a single guide rail 3.

The improved apparatus is susceptible of many additional modifications without departing from the spirit of the invention. The features which are shown in FIGS. 2-5 can be combined in a number of ways; for example, the pusher 37 of FIG. 4 can be provided with a follower which tracks an internal cam, and the apparatus of FIG. 5 can employ a conveyor 14 with carriers in the form of pushers 37.

Each of the receptacles 7a, 7b and each of the flutes 22, 23 communicates with one or more suction ports (not specifically shown) in a manner which is customary in connection with the transfer of cigarettes or other rod-shaped articles of the tobacco processing industry to ensure that the cigarettes 2a, 2b will adhere to the respective receptacles and flutes during corresponding portions of their travel from the paths which are defined by the guide rails 3a, 3b -- or guide rail 3 toward and along the path which is defined by the conveyor 14 of the second conveyor means 16. It is further clear that the direction of travel of cigarettes can be reversed without departing from the spirit of the invention.

The machine which employs the conveyor 14 or which receives articles 2a, 2b from the conveyor 14 may constitute a filter tipping machine known as MAX which is manufactured and distributed by the assignee of the present application.

An important advantage of the improved apparatus is that it can transfer pairs of cigarettes 2a, 2b from the guide rails 3a, 3b or from the rail 3 onto the conveyor 14 without risking a collision between these cigarettes during transfer at the station 19. Such absence of a collision is attributable to the feature that the plane 11 of the two files of cigarettes 2a, 2b which arrive in the directions of arrows 1a, 1b is inclined (note the angle alpha) with reference to the plane of orbital movement of arms 6 which form part of the first conveyor means 4.

Another important advantage of the improved apparatus is that the arms 6 are rotatable about their respective axes 9 so that the orientation of the receptacles 7a, 7b remains unchanged, at least while such receptacles transport cigarettes 2a, 2b from the path of the files of cigarettes 2a, 2b to the transfer station 19. This involves a movement of the receptacles 7a, 7b along the aforementioned elliptical path.

The carriers in the form of levers 26 or pushers 37 ensure proper transfer and orientation of cigarettes 2a, 2b at the critical stage of transfer of such cigarettes, namely from the receptacles 7a, 7b of successive arms 6 to the periphery of the drum-shaped conveyor 14 of the second conveyor means 16. Each of these carriers is designed to transport the respective cigarette 2b in a direction having a component substantially radially of the conveyor 14 so that the flute 23 can accept a cigarette 2b from the oncoming receptacle 7b and can move the thus accepted cigarette nearer to the axis 18 of the conveyor 14, namely so that the axis of the cigarette 2b is located on the pitch circle 24, the same as the axes of cigarettes 2a in the flutes 22 of the conveyor 14. The number of stationary flutes 22 and the number of mobile flutes 23 on the conveyor 14 will depend on a host of variables; in each instance, mobile flutes 23 on the levers 26 or pushers 37 alternate with the flutes 22 so that they can accept cigarettes 2b from receptacles 7b of successive arms 6 forming part of the first conveyor means 4.

A further important advantage of the improved apparatus is that the conveyor 4 can be identical with the corresponding conveyor of the apparatus which is shown in the aforementioned patent to Schumacher et al. except that each arm 6 is provided with two receptacles. All that is necessary is to multiply the number of receptacles on each arm of the first conveyor and to provide the second conveyor means with alternating stationary and mobile flutes.

Still another important advantage of the improved apparatus is that the mutual spacing of each pair of simultaneously transferred cigarettes 2a, 2b can be increased or reduced during transfer at the station 19. This renders it possible to conform the mutual spacing of cigarettes of the row of parallel cigarettes on the conveyor 14 to that which is most satisfactory in a filter tipping or other processing machine for the articles 2a and 2b.

Each of the receptacles 7a, 7b can be designed to accept and transport two or more plain cigarettes end-to-end. This depends on the desired number of cigarettes in each flute (22, 23) of the conveyor 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting rod-shaped articles of the tobacco processing industry, comprising means for supplying a first and a second file of rod-shaped articles, the articles of each file being coaxial with one another and the articles of said files being disposed at a predetermined distance from each other; first conveyor means having means for simultaneously removing articles from each of said files and for transporting the articles along a first path, said removing means having first and second receptacles disposed at said predetermined distance from each other and each of said removing means having a plurality of receptacles each arranged to receive an article, said first conveyor means further comprising means for orbiting said removing means in a predetermined plane and said first and second files being disposed in a second plane which makes with said predetermined plane an acute angle and is inclined with reference to the predetermined plane about an axis which is parallel to said files; and second conveyor means having means for simultaneously accepting a plurality of articles from said removing means for transport along a second path, the articles in one of said paths being transported axially and the articles in the other of said paths being transported substantially transversely of their respective axes.

2. The apparatus of claim 1, wherein said removing means includes means for advancing said first and second receptacles along an endless elliptical path and for holding the articles in said receptacles against a change of orientation.

3. The apparatus of claim 1, wherein said second conveyor means includes a rotary conveyor having axially parallel flutes which constitute said accepting means.

4. The apparatus of claim 1, wherein each of said conveyor means includes a rotary conveyor, said conveyors being rotatable about axes which are disposed at right angles to each other.

5. The apparatus of claim 1, wherein said accepting means includes a first and a second receptacle for articles, and further comprising means for moving one of said first receptacles relative to the other of said first receptacles for effecting a transfer of articles between said first receptacles.

6. The apparatus of claim 5, wherein each of said conveyor means comprises a rotary conveyor and said moving means includes means for moving said one first receptacle in a direction having a component extending substantially radially of the respective conveyor 7. The apparatus of claim 1, wherein said files are disposed in a substantially horizontal plane.

8. Apparatus for transporting rod-shaped articles of the tobacco processing industry, comprising means for supplying a plurality of parallel files of rod-shaped articles wherein the articles of each file are coaxial with one another; first conveyor means having means for simultaneously removing articles from each of said files and for transporting the articles along a first path, said removing means being arranged to orbit along said first path and including a pair of parallel receptacles each arranged to remove an article from a different file; and second conveyor means having means for simultaneously accepting a plurality of articles from said removing means for transport along a second path, the articles in one of said paths being transported axially and the articles in the other of said paths being transported substantially transversely of their respective axes, said second conveyor means comprising a rotary conveyor having a plurality of axially parallel peripheral flutes constituting said accepting means, said rotary conveyor having a rotary support and said flutes including a first flute fixedly provided on said support and a second flute movable relative to said support, said first flute being arranged to receive articles from one of said receptacles and said second flute being arranged to receive articles from the other of said receptacles.

9. The apparatus of claim 8, wherein said first path has a first portion for said one receptacle and a second portion for said other receptacle, said first portion of said first path being nearer to said second path than said second portion of said first path, said second conveyor means further comprising means for moving said second flute substantially radially of said support to and from a position for reception of articles from said other receptacle.

10. The apparatus of claim 9, wherein said moving means includes carrier means for said second flute and means for cyclically displacing said carrier means relative to said support during each revolution of said conveyor.

11. The apparatus of claim 10, wherein said carrier means includes a reciprocable pusher for said second flute and said displacing means comprises cam means.

12. The apparatus of claim 10, wherein said carrier means comprises a lever which is pivotable with reference to said support and said displacing means comprises cam means for pivoting said lever.

13. The apparatus of claim, 10, wherein said displacing means comprises a cam having a concave carrier displacing portion.

14. The apparatus of claim 10, wherein said displacing means includes a cam having a convex carrier displacing portion.

15. The apparatus of claim 10, wherein said moving means includes means for changing the mutual spacing of articles during transfer from said receptacles onto said conveyor.

16. The apparatus of claim 15, wherein said means for changing includes means for increasing the mutual spacing of articles during transfer from said receptacles onto said conveyor.

17. The apparatus of claim 15, wherein said means for changing includes means for reducing the mutual spacing of articles during transfer from said receptacles onto said conveyor.

* * * * *